(12) United States Patent
Merkel

(10) Patent No.: US 6,283,251 B1
(45) Date of Patent: Sep. 4, 2001

(54) TRUSS MODULAR SCAFFOLDING SYSTEM

(76) Inventor: Gerald Merkel, Virginia Street, P.O. Box N-3035, Nassau (BS)

(*) Notice: Subject to any disclaimer, the term of this patent is extended or adjusted under 35 U.S.C. 154(b) by 0 days.

(21) Appl. No.: 09/486,206
(22) PCT Filed: Aug. 18, 1998
(86) PCT No.: PCT/DE98/02397
    § 371 Date: Mar. 15, 2000
    § 102(e) Date: Mar. 15, 2000
(87) PCT Pub. No.: WO99/10612
    PCT Pub. Date: Mar. 4, 1999

(30) Foreign Application Priority Data

Aug. 23, 1997 (DE) .......................................... 297 15 170 U

(51) Int. Cl.[7] ................................. E04G 1/00; E04G 7/00
(52) U.S. Cl. ......................... 182/186.7; 403/246; 403/49; 182/179.1
(58) Field of Search ............................. 182/186.7, 186.8, 182/179.1; 403/49, 79, 246

(56) References Cited

U.S. PATENT DOCUMENTS

| 3,879,143 | * | 4/1975 | Gostling | 403/49 |
| 4,405,254 | | 9/1983 | Tooley | 403/246 |
| 4,525,096 | | 6/1985 | Green et al. | 403/49 |
| 4,549,634 | * | 10/1985 | Duncan et al. | 182/179.1 |
| 5,207,527 | * | 5/1993 | Duncan et al. | 403/246 |

FOREIGN PATENT DOCUMENTS

| 0 645 507 A2 | 3/1995 | (EP) . |
| 0 645 507 A3 | 3/1995 | (EP) . |
| 2 090 367 | 7/1982 | (GB) . |
| 2160947 | * 1/1986 | (GB) ............................. 182/186.7 X |

* cited by examiner

Primary Examiner—Daniel P. Stodola
Assistant Examiner—Hugh B. Thompson
(74) Attorney, Agent, or Firm—Darby & Darby

(57) ABSTRACT

A scaffolding system includes tubular columns (3) and horizontal and/or diagonal crossbars (1,2). One or more scaffolding joints (4) are arranged on each tubular column (3) and placed above and at a distance from each other. Connecting elements (1,2) are engaged with the joints nots. The tubular columns includes wedge-shaped pockets for wedge shaped plug in elements forming joints (4) and connecting elements (1,2), the wedge-shaped plug in elements (5) are arranged on the ends of the crossbars and engage with the wedge pockets (6) of varying geometry. The horizontal connecting elements (1) are mounted via above-mentioned linkage of the wedge-shaped plug-in element (5) and the wedge pocket. The diagonal crossbars (2) are mounted by means of wedge heads (7) which are arranged on each side of a diagonal brace (2.1) and are slid over the wedge pocket (6) of the tubular column (3) via the receiving opening located in the small front face lies in a flat position.

10 Claims, 5 Drawing Sheets

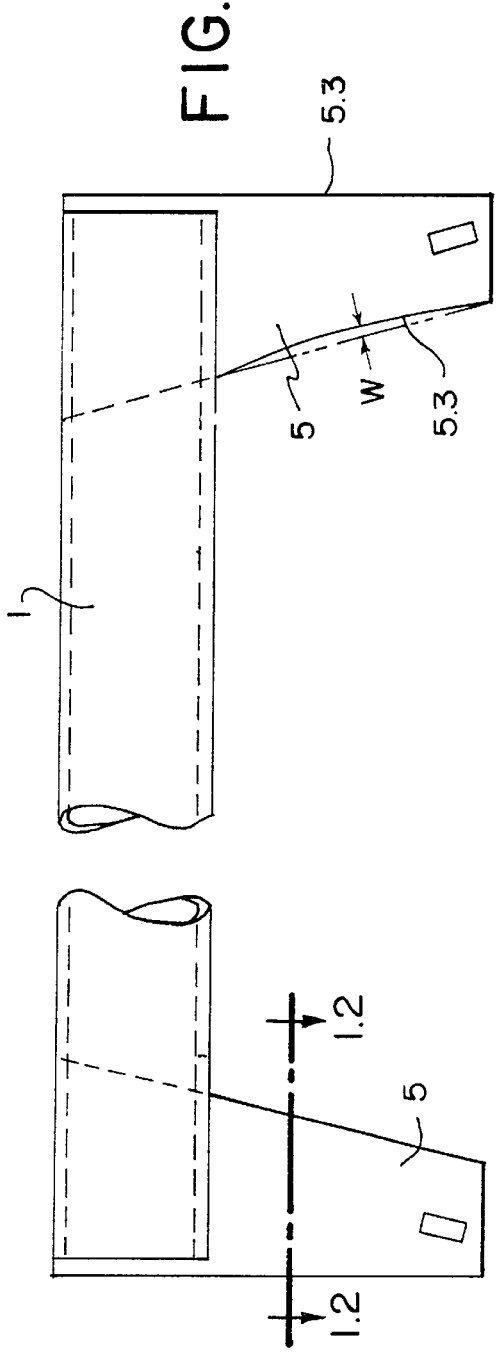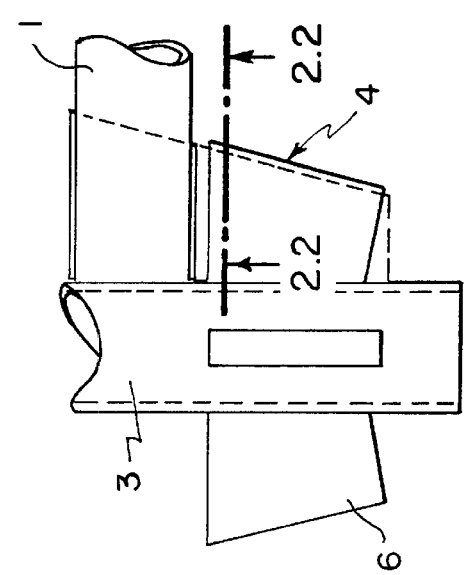

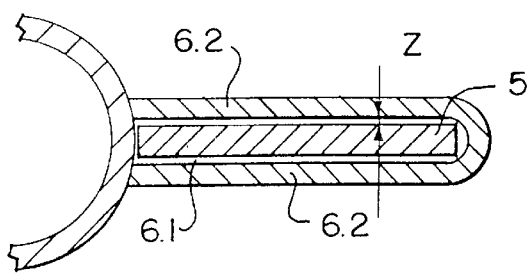
FIG. 2.2
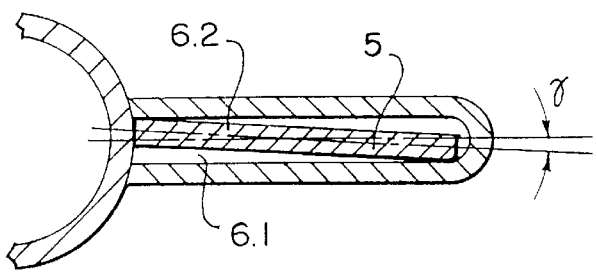
FIG. 2.3
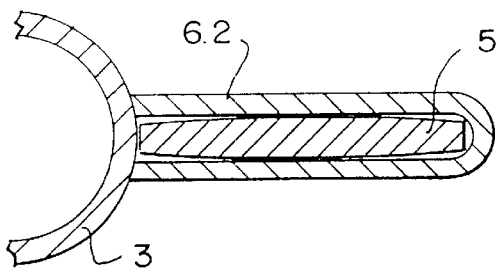
FIG. 2.4
FIG. 3.1
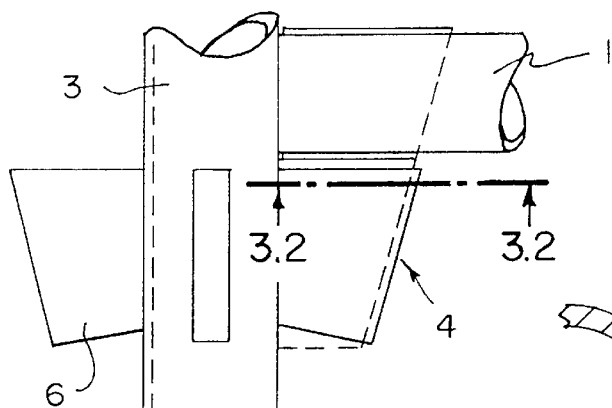
FIG. 3.2
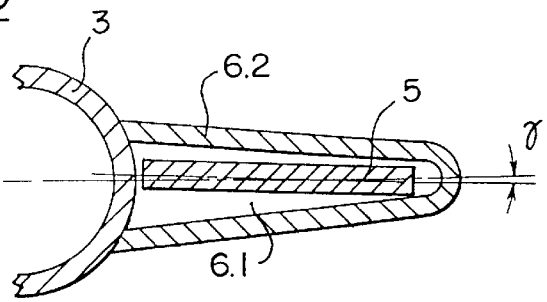

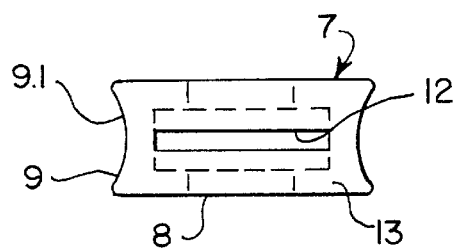
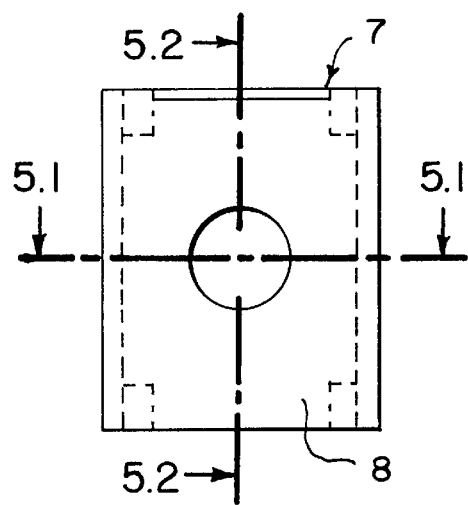
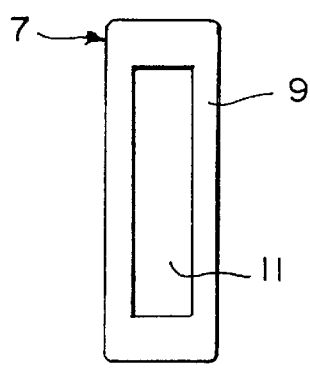
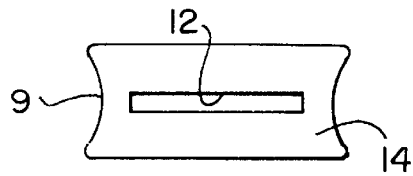
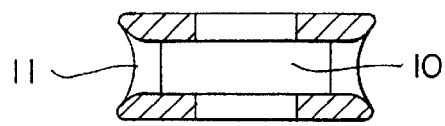
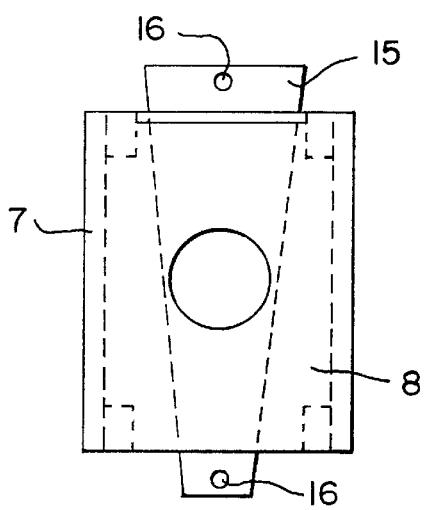
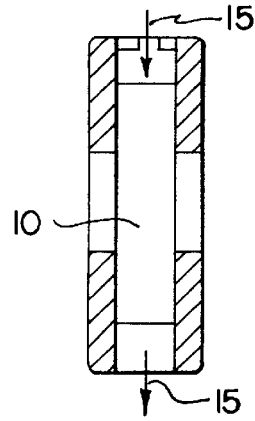

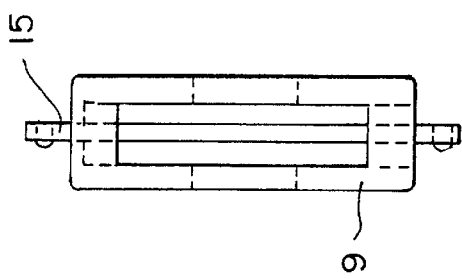
FIG. 6.2
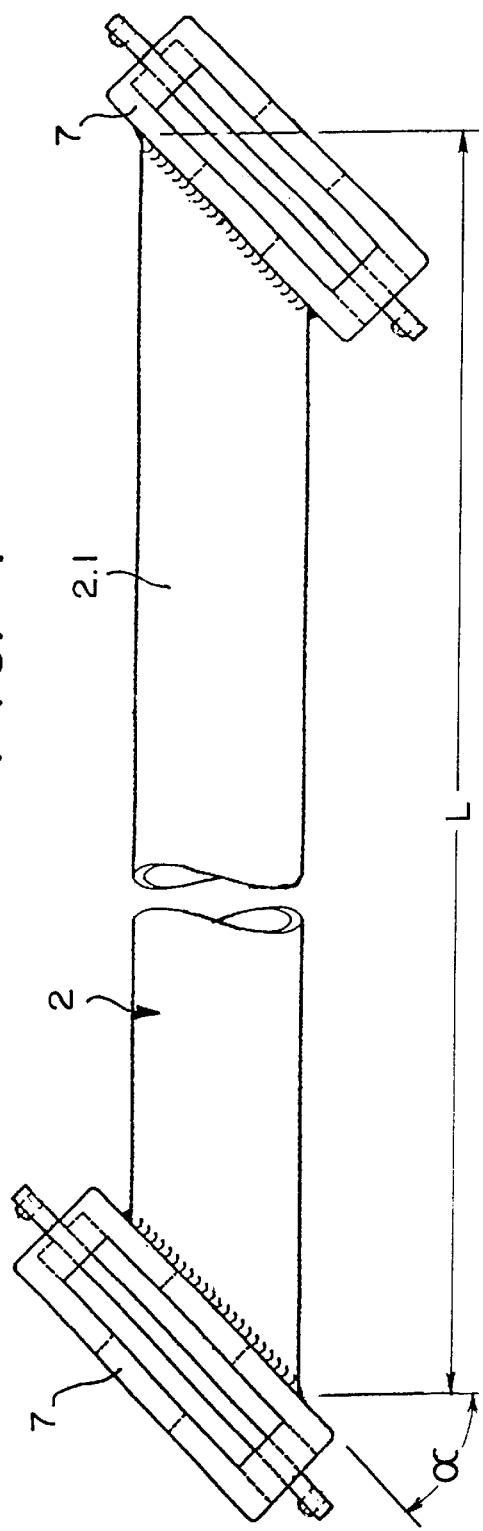
FIG. 7

TRUSS MODULAR SCAFFOLDING SYSTEM

BACKGROUND OF THE INVENTION

1. Field of the Invention

The invention relates to a scaffolding system or framework for various tasks and various fields of application comprising tubular standards and horizontal and/or diagonal scaffold members whereby one or several scaffold joints placed above each other at a distance from each other are arranged on each tubular standard, with said joints the connecting scaffold members engage.

2. Description of the Related Art

Scaffolds of this type have been state-of-the-art for years.

From U.S. Pat. No. 3,420,557, a scaffold is known, in which the scaffold joints have four wedge pockets, with which horizontal and diagonal scaffold members engage through wedge-shaped plug-in elements. Hereby it is a disadvantage that for mounting of a horizontal scaffold member the connecting head of the member is connected to the wedge pocket through a separate, captive wedge. The wedge heads of the diagonal scaffold member proposed here are rotatably connected to the ends of a diagonal brace through rivet joints that can bear only small mechanical loads.

The decisive criterion for the service features of modular scaffolding systems is the loadability of the joint when horizontal and diagonal scaffold members are connected, which is specified by the so-called joint factors. The most relevant joint factors describing the joint loadability are the permissible bending moments and the lateral, normal and diagonal loads. The higher these values are, the more economic structures can be erected because less material is necessary.

Modular scaffolding systems known on the world market, like Layher, Plettac, Rux, Hünnebeck-Röro, Cuplok, etc., use scaffold joints differing only little in their design, and therefore have approximately identical levels of economic efficiency and service features. The structure of the scaffold joints known up to now is characterized by the perforated disc and perforated shell design to EP-A-0389 933, WO 97/49880 (published Dec. 31, 1997) or DE-A-37 15 296, respectively, or the disc and cup shape with pole rosettes to EP-A-0116 679.

For modular scaffolds, scaffold bars as spacer members are by means of joint elements horizontally and vertically assembled to two- or three-dimensional scaffolding structures to be used as façade, room or other scaffolds. To achieve more service variability, improved service properties, more economical design capabilities, reduced manufacturing effort for modular scaffolds and their system elements, and effective less time-consuming assembly, solutions requiring less material, with higher joint loadabilities, or joint factors, for modular scaffolding systems are demanded.

These system elements have to be designed and must interact in performing their function when mechanically jointed to structures in order to bear forces, loads and bending moments in such a way that all safety-relevant requirements are reliably fulfilled. The safety-relevant requirements also concern the incorporation of lift-off protectors, which has been required up to now. Lift-off protectors are system elements with safety devices additionally required in order to protect the scaffold plates from being lifted off by the action of wind or storm.

Vertical diagonal braces and horizontal diagonal braces (diagonal scaffold members) are necessary to accept and carry off diagonal forces in modular scaffolds and, therefore, also in truss structures of scaffold members to ensure the stability and safety required.

The vertical diagonal braces known in the market, which are used in the modular scaffold systems of most manufacturers, can accept only relatively small diagonal loads at the scaffold joint.

The relatively small permissible load values result from the constructional structure of the known vertical diagonal braces. For the known disk, plate or cup types of joint connection, the maximum permissible diagonal load application of the scaffold joint is relatively small and hence, only little suited for special truss structures made of tubular standards, horizontal scaffold members and diagonal scaffold members.

A modular scaffold joint with substantially improved joint factors is described in EP-B-0622 504. A scaffold joint to this solution has four wedge pockets, with which the connecting members engage through wedge-shaped plug-in elements.

Wedge pockets and wedge-shaped plug-in elements have similar fit shapes with the wedge pockets having parallel walls.

SUMMARY OF THE INVENTION

It is the object of the invention, in order to ensure that a modular scaffold system can be used as a façade scaffold and a truss, to further develop the technical and design structure of the system components, particularly scaffold plates, scaffold joints and connecting elements as well as the accompanying vertical diagonals and other system components, so that the joint factors, or joint load bearing capacity, and the stability parallel to the façade of the wedge-pocket modular scaffold system with all system components interacting are enhanced, thus meeting the newest acceptance requirements also under cyclic and dynamic loading.

Fitness for use as a façade scaffold means that the stiffness parallel to the façade is increased by technical design measures using improved scaffold elements so that the acceptance requirements for all regular design modifications of a façade scaffold are met without restriction (up to the 8 m-anchor module). This leads to the optimization of the material, storage and transportation demands as only one scaffold system will be necessary to cover all fields of application. Because the manufacturing expenditure of this developed wedge-pocket scaffold system is approximately identical, or even smaller than a frame scaffold system, it is no use to purchase, or have ready for use, several scaffold systems as scaffolders used to do.

Truss capability means that the joint factors are increased by technical design measures so that, among others, the joint permissible tension load of the vertical diagonal is approximately equal to the permissible normal load joint factor, which is also to be increased, of the scaffold joint (positive and negative).

In wedge-pocket modular scaffolds or scaffolds with wedge-type plug-in connections of the scaffold joints and joint elements, the wedge-shaped plug-in elements at the spacer member ends engage with wedge pockets whose geometry deviates from the cross section of the plug-in elements.

The wedge-shaped plug-in elements are thereby fixed to the ends of the spacer members. After mounting of the horizontal connecting components the wedge-shaped plug-in elements are positioned in the wedge pockets in such a way that their short sides bear against the tubular standard as well as against the face of the wedge pocket (6) opposite to the tubular standard.

Bearing of the wedge-shaped plug-in elements against both sides via their short sides, the so-called wedge surface intersecting sides, ensures in conjunction with the design of these short sides, the high load capacity of the plug joint. For this, the wedge surface intersecting sides have, in addition to the known straight profile, a profile that is concave to the inside. The concave curvature depth can be 0.5 mm. In addition, the wedge surface intersecting sides have an exactly defined surface. In addition to the defined concave curvature they have a predetermined surface roughness with a roughness height of 120 μm.

The wedge-shaped plug-in elements can be made, similar to the state-of-the-art, to have a rectangular cross section, i.e. with their flank sides parallel to each other, or a convex cross section, i.e. with curved flank sides. In a special embodiment, the angle of curvature, β, increases beginning from the face side of the wedge-shaped plug-in element turned to the tubular standard with β=0.

The mounting openings of the wedge pockets are made clearly wider compared to the thickness of the wedge-shaped plug-in elements so that a clearance of approx. 1 mm exists on each side between the flank sides of the wedge-shaped plug-in elements and the inner walls of the wedge pockets.

In another preferred embodiment, the clearance intended to allow a radial swivel of the wedge-shaped plug-in element within the wedge pocket is created due to the fact that the sides of the wedge pocket are not parallel to each other but approach each other with increasing distance from the tubular standard. In this way, the wedge pocket takes a truncated wedge-shaped cross section.

The horizontal connecting elements are mounted by means of the described joint couple wedge pocket-wedge-shaped plug-in element. The diagonal scaffold members are mounted by means of wedge heads non-rotatably fixed at each end of a diagonal brace, which are slided over the appropriate wedge pocket.

A vertical diagonal brace according to the invention consists of a tube of the length L, which is diagonally cut at both ends at an angle α dependent on the length L, and a wedge head seated transversely, i.e. on its long side, at each of these ends. The firm connection between wedge head and diagonal brace is made, for instance, by welding.

The wedge head is a cuboid-shaped hollow body having two long sides, two short face sides with a rounded recess each and mounting openings for the wedge pocket as well as a top and a bottom side with a slot-shaped opening each to slide in a captive wedge. To the long side, the tube of the diagonal brace is welded with its diagonally cut ends seated at the angle α.

In assembly position, the wedge head of the vertical diagonal brace, which is slided onto the wedge pocket of the tubular standard by use of its mounting opening on the short side, bears with its surface against the wall of the tubular standard by means of the recess on the short face side in the joint range. Locating of the vertical diagonal brace, i.e. of the wedge head in this mounting position, and subsequent locking and fastening is by sliding in, or driving in (by impact) of a wedge lying in the plane of the long side and wedge pocket. This wedge passes through the slot-shaped opening on the top side of the wedge head and the wedge pocket and comes out through the slot-shaped opening on the bottom side of the wedge head.

This joint connection according to the invention results in a force-closed connection of the vertical diagonal brace with the tubular standard. This ensures that a large part of the load acting via the vertical diagonal brace is transferred directly into the tubular standard exerting only little leverage.

The horizontal stability required for approval as a façade scaffold is achieved by the installation of system scaffold plates with tubular cross bar bearing and automatic lift-off protection devices driven by gravity. The solution according to the invention, namely lift-off protectors integrated in the system scaffold plates automatically acting by gravity allows to dispense with lift-off safety devices necessary in the known modular scaffold systems.

The interaction of all scaffold components according to the invention in the scaffold system and the permissible values substantially improved in comparison to known modular scaffold systems, of the most important joint factors lead, in conjunction with the force-closed connection of the scaffold plates with tubular cross bar bearing and integrated automatic lift-off protection ensuring the horizontal stiffness, to a number of advantages and more economic design variations. The main advantage is that only one scaffold system is required for all uses and fields of application. Among others, the fields of application of wedge-pocket modular scaffolds can be extended to the erection of scaffolds around containers or circular buildings. Additionally, the flexibility and variability of the new modular scaffold can be enhanced by the solutions according to the invention and by other system components as, e.g., bracket consoles, suspended elements for supporting bars and shelter mountings admitted for use by the supervising authority, Institut für Bautechnik Berlin, in Z-8.22-861 of Jun. 14, 1999 (joint admitted for engineering scaffolding) and façade scaffold approval Z-8.1-842 of Dec. 19, 1997.

A considerable advantage results from the use of the wedge-pocket modular scaffold system in standard version together with an instruction for the erection and use as part of the first legally effective façade scaffold approval given to a modular scaffold system according to the latest directives for approval. Hereby the new scaffold system can be used for various structural façade scaffold versions without the usability certificate additionally required up to now in form of a structural analysis and the approval for the individual application case.

New or more economic design capabilities and advantages in engineering scaffolding result also from the immensely high loadability of the vertical diagonal connection in interaction with the other improved, or higher, scaffold joint factors. Such fields of application are, for example, carrying and supporting scaffolds, and scaffolds for formwork as well as the assembly and disassembly of truss supporting structures such as sheds, hall-type buildings and their roofs, temporary bridges, stands, grandstands, platforms, stages, podiums, exhibition stands and advertising racks of any span, shape and size.

The use of the vertical diagonal bracing according to the invention leads to a considerably wider range of applications of modular scaffolds for the efficient erection and disassembly as well as the economic, easy, fast and reliable assembly of scaffolds with various assembly possibilities for truss structures.

Relevant benefits particularly when used for formwork result from the capability to work without any gap between the plates and scaffold standards as the cross bar approaches the standard in a lift.

In scaffold structures the number of vertical diagonal braces required can be considerably reduced due to the novel construction of the described scaffold joint with the essentially higher joint loadability values, especially due to the high bending moment bearing capacity of the scaffold member connection. For all regular versions of the façade scaffolds, diagonals need not be installed according to the approval by supervising authorities mentioned above, with the exception of some special cases.

Further details, features and advantages of the invention will be disclosed by the following description of an example of embodiment with reference to the accompanying drawing.

BRIEF DESCRIPTION OF THE DRAWINGS

FIGS. 1.1 through 1.4—the shaping of the wedge-shaped plug-in elements,

FIGS. 2.1–2.4 and FIGS. 3.1–3.2—the geometry of the wedge pocket,

FIGS. 4.1, 4.2a, 4.2b and 4.3—the constructional design of the wedge head,

FIGS. 5.1 and 5.2—the sections 1.2—1.2 and 2.2—2.2 through the wedge head to FIG. 4.2, FIGS. 6.1 and 6.2—the wedge head with the wedge slided in, FIG. 7—a complete diagonal brace according to the invention, FIG. 8—the top view of a diagonal brace in mounting position, and FIG. 9—the constructional design of a scaffold joint according to the invention, with wedge pockets and two horizontal scaffold members and one diagonal brace hung in.

DETAILED DESCRIPTION OF THE PRESENTLY PREFERRED EMBODIMENTS

Figure 8:
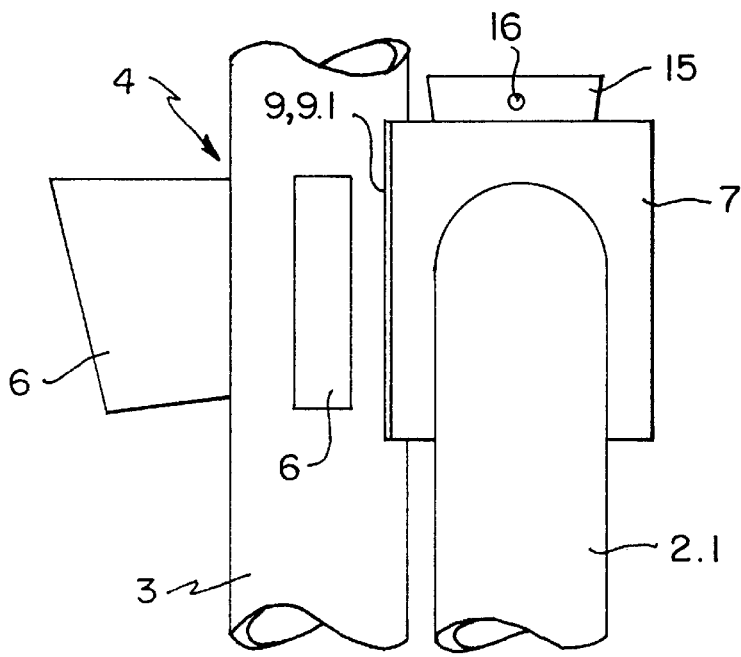

FIG. 1.1 shows the design of a horizontal scaffold member 1 (ends) with wedge-shaped plug-in elements 5 attached to the ends. The right-side end in FIG. 1.1 of the horizontal scaffold member is provided with a wedge-shaped plug-in element 5 whose wedge surface intersecting sides 5.3 have a profile concave to the inside with a curvature depth w of approximately 0.5 mm. The intersecting sides are rectangular and have a predetermined surface roughness with a roughness height of 120 $\mu$m. The section 1.2—1.2 in FIG. 1.2 gives a survey of the preferred sections of the wedge-shaped plug-in elements 5. The flanks 5.1 can also be convex, i.e. made with a curvature. In a special embodiment (bottom representation in FIG. 1.2), the angle of curvature is $\beta=0$ on the face side 5.2 turned to the tubular standard 3 (cf. FIG. 2), and increases in axial direction of the horizontal scaffold member 1.

FIGS. 2.1–2.3 and FIGS. 3.1 and 3.2 show the geometry of the wedge pocket 6 whereby four wedge pockets 6 form a scaffold joint 4 and are attached, preferably welded, to the modules of the tubular standard 3 in certain distances. In the first design version of the wedge pocket 6 in FIGS. 2.1–2.4 the wedge pocket has parallel side walls 6.2 and a mounting opening 6.1 with a clearly larger width than the thickness of the wedge-shaped plug-in element 5 hung in. The clearances z between the flank sides of the wedge-shaped plug-in elements 5 and the inner walls of the side walls 6.2 are about z=1 mm each. This geometry according to the invention of the couple of wedge-shaped plug-in elements 5 and wedge pockets 6 makes possible radial swivelling of the horizontal scaffold members 1 by the angle $\gamma$, which is advantageous for scaffolding around circular buildings.

In a second embodiment of the wedge pocket 6, to FIGS. 3.1 and 3.2, the side walls 6.2 of the wedge pocket 6 approach each other so that, in section, a conical profile of the side walls 6.2 follows.

FIGS. 4.1–4.3 shows the constructional design of the wedge head 7 made as a cuboid-shaped hollow body. FIG. 4.1 shows the top side 13 with the slot-shaped opening 12 for the wedge 15. The outline is formed of the long sides 8 and the short face sides 9. In assembly position (cf. FIGS. 8 and 9), the wedge head 7 bears against the tubular standard via the recess 9.1.

FIGS. 4.2a and 4.2b shows, on the left side, the long side of the wedge head 7, on which the tube 2.1 of the diagonal brace (cf. FIG. 7) diagonally cut at the angle $\alpha$ is seated and attached. The drawing on the right side shows a short face side 9 with the mounting opening 11, through which the wedge pocket 6 is slided during assembly of the diagonal brace to the tubular standard 3.

The object of FIG. 4.3 is, similar to FIG. 4.1, the bottom side 14 of the wedge head 7 with the slot-shaped opening 12, through which the wedge 15 protrudes during assembly.

The sections 1.2—1.2 and 2.2—2.2 in FIG. 5 show the design of the hollow space 10 of the wedge pocket 7 as well as the proportions of wall thickness and hollow space 10. The hollow space 10 serves via the openings 11 to accept the wedge pocket 6, and via the openings 12 to guide the wedge 15. The walls can be rounded at the entering portions of the openings 11.

FIGS. 6.1 and 6.2 shows the front and side view of a wedge head 7 onto its long side 8 and its short side 9, with the wedge 15 slided-in, i.e. in lock position. The notched taper pins 16 in the wedge 15 ensure that the wedge can be moved during assembly and disassembly; they ensure the wedge to be captive.

FIG. 7 illustrates the structure of a complete diagonal brace consisting of a tube 2.1 and the wedge heads 7. The length L varies with varying angle $\alpha$.

FIG. 8 shows the described diagonal bracing 2 consisting of the wedge head 7 and the tube 2.1 in assembly position. The shown joint 4 at the scaffold standard 3 has four wedge pockets 6. The invisible right-side wedge pocket 6 is slided into the wedge head 7 over its mounting opening 11 in the short face side 9. The wedge 15 is inserted and passes through the opening 12 on the top side 13 of the wedge head 7, the wedge pocket 6 and the opening 12 on the bottom side 14 of the wedge head 7, cf. FIG. 6. The short face side 9 of the wedge head 7 with the recess 9.1 is pressed with its surface to the wall of the tubular standard 3 by means of the force-closed connection made by the inserted wedge 15.

Figure 9:
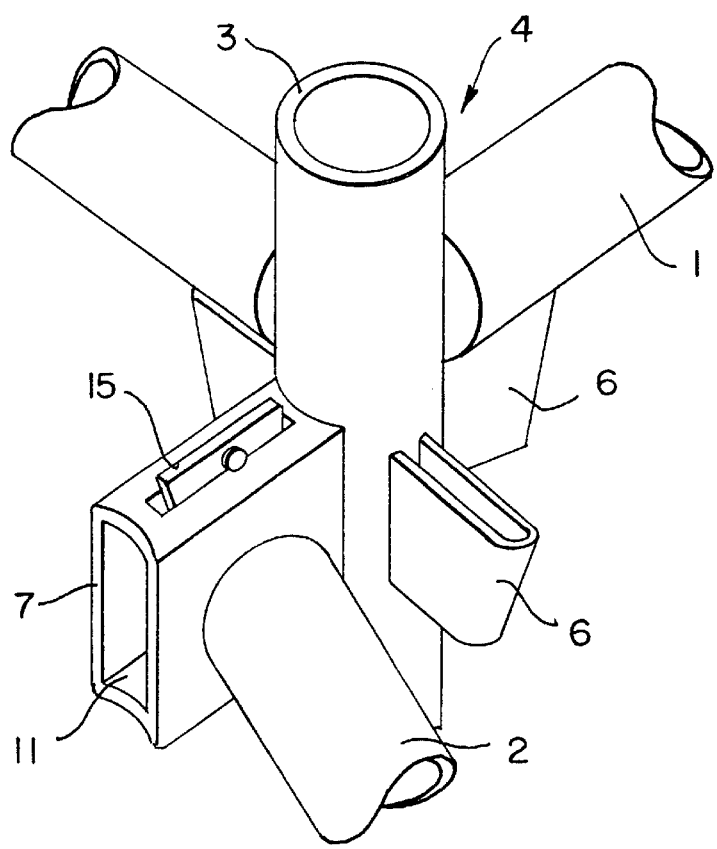

In FIG. 9 the structural design of a scaffold joint 4 according to the invention, with wedge pockets 6 and two horizontal scaffold members 1 and a diagonal scaffold member 2 hung in is seen. The diagonal scaffold member 2 is slided in arrow direction over the wedge pocket 6 so that the wedge head 7 takes the wedge pocket 6 and locking of the couple wedge head 7—wedge pocket 6 in this assembly position is by wedge 15.

What is claimed is:

1. A truss modular scaffold system comprising
   a plurality of tubular standards (3);
   a plurality of horizontal and diagonal scaffold members (1,2), including a plurality of system components;
   wherein each of the plurality of tubular standards (3) include at least one scaffold joint (4) having four wedge pockets (6);
   the at least one scaffold joint (4) is adapted to connect with at least one of the plurality of the horizontal and diagonal scaffold members (1,2) by utilizing a plurality of wedge-shaped plug-in elements (5, 15) having a thickness and being associated with the scaffold members (1,2);

wherein, for mounting of the horizontal scaffold members (1), the at least one wedge-shaped plug-in element (5) engages with a respective one of the at least four wedge pockets (6);

each of said four wedge pockets (6) comprise parallel side walls (6.2) forming a mounting opening (6.1) which is wider than the thickness of the wedge shaped plug-in element (5); and for mounting of one of the diagonal scaffold members (2) there is, at each end of a diagonal brace (2.1), a wedge head (7) is arranged and configured such that it, seated on the wedge pocket (6), bears against the tubular standard (3) and is locked by means of a wedge (15) passing through a wedge head (7) having a wedge pocket (6), wherein the wedge-shaped plug-in elements (5) include a front and a rear wedge surface intersecting side (5.3) and having wedge surfaces curved to the inside.

2. The truss modular scaffold system according to claim 1, wherein the wedge-shaped plug-in elements (5) have a convex cross section and the curvature of the flank sides (5.1) increases beginning from the face side (5.2) of the wedge-shaped plug-in elements (5) turned to the tubular standard (3) with an angle of curvature $\beta=0$.

3. The truss modular scaffold system according to claim 2, wherein the wedge surface intersecting side (5.3) has a predetermined surface roughness with a roughness height of 120 $\mu$m.

4. The truss modular scaffold system according to claim 3, wherein the curvature depth, w, of the wedge surface intersecting side (5.3) is about 0.5 mm.

5. The truss modular scaffold system according to claim 4, wherein one of the diagonal scaffold members (2) comprises a tube (2.1) of length L, the tube (2.1) includes ends diagonally cut at an angle $\alpha$, and which each terminate in a wedge head (7) for mounting of the diagonal brace (2) at the joint (4) of the tubular standard (3), the wedge head (7) further comprises, at each of a short face side (9), a recess (9.1) matching with peripheral curvature of the tubular standard (3) and, in mounting position, bears to the tubular standard (3) via the recess (9.1), the wedge (7) has a hollow space (10), into which said wedge pocket (6) of the tubular standard (3) is entered through a mounting opening (11) in the short face sides (9) of the wedge head (7), and other slot-shaped openings leading said hollow space (10) in the wedge head (7) exist on a top side (13) as well as on a bottom side (14) of the wedge head (7), through which the wedge (15), which matches with a slot shape of the openings (12), entering through one of the openings, subsequently passing the wedge pocket (6) and leaving through the other opening (12) on the bottom side (14), is inserted, whereby the wedge head (7) is pressed against the tubular standard (3) with one of the short face side (9) thereby fixing and fastening the vertical diagonal bracing in a mounting position.

6. The truss modular scaffold system according to claim 5, wherein the wedge (15) has a notched taper pin each at its broader top end and its smaller bottom end which prevents sliding-out of the wedge (15) from the slot-shaped openings (12) on the top side (13) or bottom side (14) of the wedge head (7).

7. The truss modular scaffold system according to claim 6, wherein the wedge (15) has a unique wall thickness over its whole length, which is smaller than the width of the opening of the wedge pocket (6) and the width of the slot openings (12).

8. The truss modular scaffold system according to claim 7, wherein the length and conical shape of the wedge (15) are made such that, in said mounting position, the wedge (15) passes the wedge pocket (6), protrudes on both sides (13, 14) of the wedge head (7), and presses with one of the face side (9) of the wedge head (7) with the recess (9.1) to the tubular standard (3) by the flank pressure of the wedge (15) in the wedge pocket (6).

9. The truss modular scaffold system according to claim 8, wherein the tube (2.1) of the diagonal brace can be made in various lengths L, whereby with increasing length L the angle $\alpha$ for the connection of the tube (2.1) to the long side (8) of the wedge head (7) decreases.

10. The truss modular scaffold system according to claim 9, wherein, in order to achieve the necessary horizontal stiffness for use as a facade scaffold, tubular cross bar plates bear on the horizontal scaffold members (1) between the scaffold joints (4) by means of claws and are locked by automatic lift-off protection devices, whereby the claws are fastened to the frame of the tubular cross bar plates and the lift-off protection devices are integrated into the frame of the tubular cross bar plates and are driven by gravity.

* * * * *